April 14, 1953     C. L. BABB     2,635,015
SPLIT TYPE SHAFT SLEEVE BEARING
Filed Nov. 13, 1951

Inventor
Charles L. Babb
by John Stevens Lieb
Attorney

Patented Apr. 14, 1953

2,635,015

UNITED STATES PATENT OFFICE 2,635,015

SPLIT TYPE SHAFT SLEEVE BEARING

Charles L. Babb, Milwaukee, Wis., assignor to Allis-Chalmers Manufacturing Company, Milwaukee, Wis.

Application November 13, 1951, Serial No. 256,088

10 Claims. (Cl. 308—15)

This invention relates generally to bearing structures for rotary shafting, and is more particularly concerned with the provision of a shaft bearing incorporating improved features of construction affording material advantages as to ease of assembly and as to the removal and replacement of worn parts.

Rotary shafts such as those which are relatively inaccessible, are often journaled in bearing structures having split bearings. The expedient of splitting the bearings facilitates their ready installation, removal and replacement. In conjunction with such split bearings it is also common practice to use expendable, wear absorbing cylindrical bearing sleeves secured to and surrounding the rotary shaft and so positioned on the shaft as to coact with the aforementioned split bearings. In some cases these sleeves have been nonsplit and secured to the shaft with at least a portion of their inner surfaces out of contact with the shaft, while in other applications the sleeves have been split and secured to the shaft along their entire inner surfaces. Either of these constructions is open to the objection that removal or replacement of the sleeve entails an involved operation requiring movement of the bearing housing structure or shafting in order to render the desired parts accessible.

The present invention has as an object to provide an improved bearing structure which will eliminate the necessity of moving or shifting the bearing housing structure or the rotary shaft in order to remove and replace worn bearing parts.

Another object of this invention is to provide an improved bearing structure incorporating split sleeves combined for coaction with a rotary shaft and a bearing housing in a novel manner affording a ready replacement of worn parts without moving the shaft and without disassembling the housing structure.

Still another object of the present invention is to provide an improved shaft supporting sleeve bearing which eliminates a precision machining of the enclosed shaft surface and of the internal sleeve surface.

Other objects and advantages will appear from the following description of a structure illustrating an embodiment of the invention, reference being had to the accompanying drawing, in which.

Figure 1:
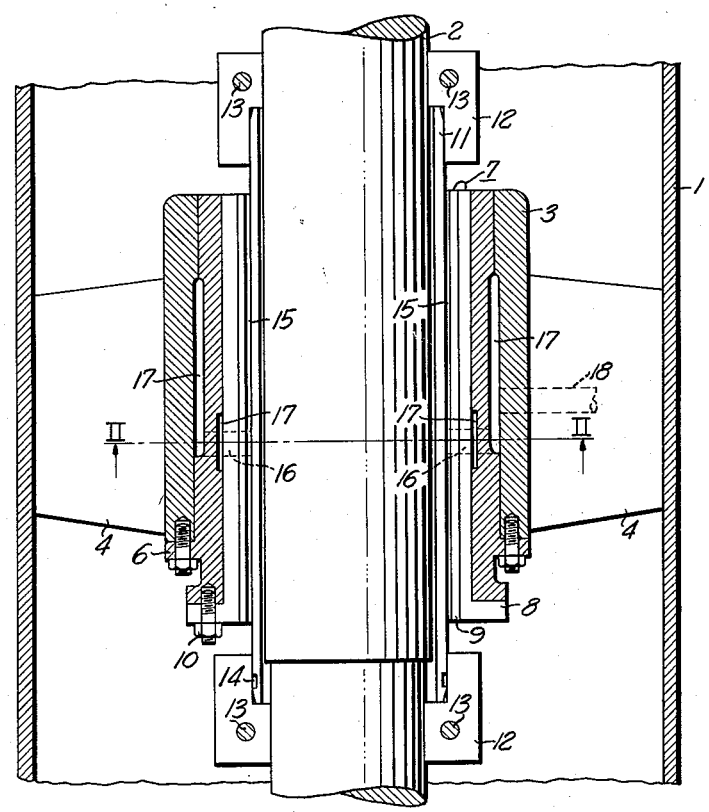
Fig. 1 is a longitudinal section through a bearing assembly embodying the invention.
Figure 2:
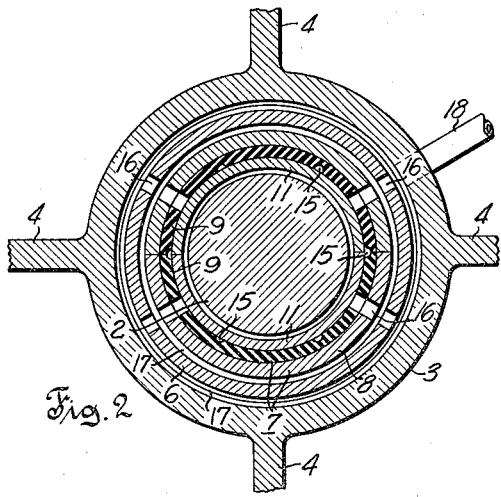
Fig. 2 is a transverse cross section of the bearing assembly taken on the line II—II of Fig. 1.
Figure 3:
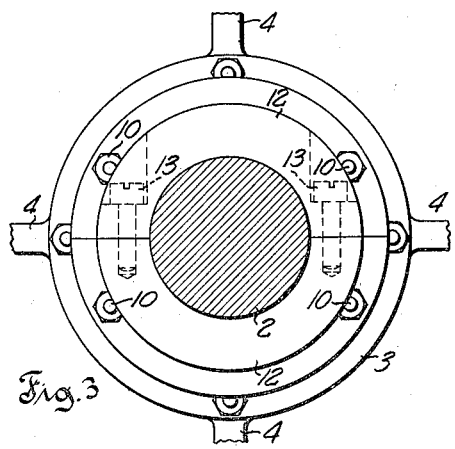
Fig. 3 is a bottom end view of the bearing assembly shown in Fig. 1.

Referring to the drawing, it will be seen that the invention may be considered as applied to a hydraulic apparatus comprising a vertical conduit 1 enclosing a shaft 2 having its lower end operatively connected with a rotating apparatus, such as a submerged centrifugal pump (not shown). Shaft 2 is rotatably supported in conduit 1 by means of a bearing structure including a housing 3 carried by radially extending struts or spider members 4 terminally secured to the internal surface of conduit 1.

More specifically, housing 3 supports additional bearing structure comprising a hollow cylindrical spacer shim 6 bolted directly to housing 3 and disposed snugly within an axial aperture defined thereby. A hollow member such as a cylindrical split rubber bearing insert 7 having a metal backing portion 8 and a rubber bearing portion 9, passes through, and is secured to the spacer shim 6 by any suitable externally accessible means such as stud bolts and nuts 10. From the foregoing it can be seen that rubber bearing portion 9 presents an inner cylindrical bearing surface.

A split shaft sleeve 11 is journaled within rubber bearing portion 9 of split rubber bearing insert 7, said sleeve 11 comprising complementary arcuate segments fixedly secured to rotary shaft 2 by retaining means such as split clamps 12. These split clamps are drawn together by mechanical tensioning means such as cap screws 13 so as to fit snugly around shaft 2 and shaft sleeve 11, securing one to the other and preventing relative rotation therebetween. Sleeve 11 has its internal surface radially spaced from the surface of shaft 2 in such a manner that the outer bearing surface defined by sleeve 11 is coaxial to shaft 2. Sleeve 11 is provided adjacent one end with an annular slot 14 in its outer surface which, when the associated clamp is removed, is operably engageable by any suitable pulling tool or other appropriate device for withdrawing said sleeve from bearing insert 7.

Split clamps 12 each comprise complementary elements presenting outer portions supportingly coacting with sleeve 11 and inner portions fixedly engaging shaft 2.

The bearing structure is provided with a generally conventional lubricating passage arrangement (flutes 15, radial passages 16, annular spaces 17 and supply conduit 18) which is not shown in detail as this feature forms no part of the present invention.

When shaft 2 is rotated, clamps 12 and shaft sleeve 11 rotate therewith. The outer surface of shaft sleeve 11 bears upon the inner surface of split rubber bearing insert 7 in which sleeve 11 is journaled. After bearing friction has worn shaft sleeve 11 beyond its maximum tolerance limit, rotation of shaft 2 is stopped and clamps 12 are unbolted and removed therefrom. Next a pulling device is engaged with the annular slot 14 in shaft sleeve 11, and sleeve 11 is pulled longitudinally along shaft 2 until it is out of engagement with rubber bearing insert 7. After shaft sleeve 11 has thus been pulled clear of bearing portion 9 and of housing 3, its arcuate segments can be readily separated and the sleeve then removed from shaft 2. A new shaft sleeve 11 is installed by fitting its arcuate segments together around the shaft 2, by then sliding the assembled sleeve into rubber bearing insert 7, and by finally replacing clamps 12 to fixedly engage said shaft and said sleeve.

From the foregoing it should be obvious to one skilled in the art that a bearing constructed according to the invention has the advantage of providing protection to the rotary shaft against bearing friction wear. Such a construction also eliminates the time consuming and expensive operation of precision machining the bearing portion of the shaft.

It should also be obvious to one skilled in the art that because the bearing sleeve is split, it affords an easily replaceable element especially advantageous for use in conjunction with enclosed or inaccessible shafts. Since a bearing mounted according to this invention is out of contact with the shaft it surrounds, the sleeve need not be precision machined on its internal surface, and is therefore simple and inexpensive to manufacture.

The accompanying disclosure is illustrative of but one practical construction embodying the present invention. Accordingly it is to be understood that the invention is not limited to the exact details of construction, combination and/or operation herein set forth, but that it covers the various modifications falling within the scope of the appended claims which may occur to any person other than the inventor.

It is claimed and desired to secure by Letters Patent:

1. A bearing assembly comprising a fixedly supported housing having an opening therethrough, a hollow member fixedly mounted in said housing and presenting an inner cylindrical bearing surface, a sleeve journaled in said bearing surface and extending beyond the opposite ends of the latter and of said housing, a shaft extending freely through said sleeve, said sleeve having an internal diameter sufficiently greater than the external diameter of said shaft to provide a radial space therebetween, and a retaining means removably uniting said sleeve and shaft for rotation as a unitary structure relative to said bearing surface.

2. A bearing assembly comprising a fixedly supported housing having an opening therethrough, a hollow member fixedly mounted in said housing and presenting an inner cylindrical bearing surface, a sleeve journaled in said bearing surface and extending beyond the opposite ends of the latter and of said housing, a shaft extending freely through said sleeve, said sleeve having an internal diameter sufficiently greater than the external diameter of said shaft to provide a radial space therebetween, and a retaining means removably fixedly secured to portions of said shaft disposed in axially outward and adjacent relation to the opposite ends of said sleeve, said retaining means including portions supportingly receiving and positioning said ends of said sleeve in radially spaced relation to said shaft for rotation coaxial therewith.

3. A bearing assembly comprising a fixedly supported housing having an opening therethrough, a hollow member detachably fixed in said housing by an externally accessible means affording removal of said member axially of said opening, said member presenting an inner cylindrical bearing surface, a sleeve journaled in said bearing surface and extending beyond the opposite ends of the latter and of said housing, a shaft extending freely through said sleeve, said sleeve having an internal diameter sufficiently greater than the external diameter of said shaft to provide a radial space therebetween, and a retaining means removably fixedly secured to portions of said shaft disposed in axially outward and adjacent relation to the opposite ends of said sleeve, said retaining means including portions supportingly receiving and positioning said ends of said sleeve in radially spaced relation to said shaft for coaxial rotation therewith.

4. A bearing assembly comprising a fixedly supported housing having an opening therethrough, a hollow member detachably fixed in said housing by an externally accessible means affording removal of said member axially of said opening, said member presenting an inner cylindrical bearing surface, a sleeve journaled in said bearing surface and extending beyond the opposite ends of the latter and of said housing, a shaft extending freely through said sleeve, said sleeve having an internal diameter sufficiently greater than the external diameter of said shaft to provide a radial space therebetween, and a retaining means removably uniting said sleeve and shaft for rotation as a unitary structure relative to said bearing surface.

5. A bearing assembly comprising a fixedly supported housing having an opening therethrough, a hollow member fixedly mounted in said housing and presenting an inner cylindrical bearing surface, a sleeve journaled in said bearing surface and extending beyond the opposite ends of the latter and of said housing, said sleeve comprising complementary arcuate segments, a shaft extending freely through said sleeve, and a retaining means including outer portions holding said segments in journaled relation within said bearing surface and including inner portions fixedly engaging opposed portions of said shaft.

6. A bearing assembly comprising a fixedly supported housing having an opening therethrough, a hollow member fixedly mounted in said housing and presenting an inner cylindrical bearing surface, a sleeve journaled in said bearing surface and extending beyond the opposite ends of the latter and of said housing, a shaft extending freely through said sleeve, and retaining means removably fixedly secured to portions of said shaft disposed in axial outward and adjacent relation to the opposite ends of said sleeve, said retaining means each including complementary elements coacting to present portions supportingly receiving and positioning said ends of said sleeve in radially spaced relation to said shaft for coaxial rotation therewith, and tensioning means operable for drawing said elements tightly together to fixedly engage said shaft and said sleeve and prevent relative rotation therebetween.

7. A bearing assembly comprising a fixedly supported housing having an opening therethrough, a hollow insert removably fixedly mounted in said housing and presenting an inner cylindrical bearing surface, a sleeve journaled in said bearing surface and extending beyond the opposite ends of said insert and of said housing, said sleeve comprising complementary arcuate segments, a shaft extending freely through said sleeve, and a retaining clamp removably fixedly securing opposite end portions of said sleeve to said shaft for rotation therewith, said retaining clamps each comprising complementary elements coacting to present portions supportingly receiving said ends of said sleeve and positioning the latter in coaxial relation to said shaft.

8. A bearing assembly comprising a fixedly supported housing having an opening therethrough, a hollow insert detachably fixed in said housing by an externally accessible means affording removal of said insert axially of said opening, said insert presenting an inner cylindrical bearing surface, a sleeve journaled in said bearing surface and extending beyond the opposite ends of the latter and of said housing, said sleeve comprising complementary arcuate segments, a shaft extending freely through said sleeve, and a retaining clamp removably fixedly securing opposite end portions of said sleeve to said shaft for rotation therewith, said retaining clamps each comprising complementary elements coacting to present portions supportingly receiving said ends of said sleeve and positioning the latter in coaxial relation to said shaft.

9. A bearing assembly comprising a fixedly supported housing having an opening therethrough, a hollow insert removably fixedly mounted in said housing and presenting an inner cylindrical bearing surface, a sleeve journaled in said bearing surface and extending beyond the opposite ends of said insert and of said housing, said sleeve comprising complementary arcuate segments, a shaft extending freely through said sleeve, said sleeve having an internal diameter sufficiently greater than the external diameter of said shaft to provide a radial space therebetween, and a retaining clamp removably fixedly securing opposite end portions of said sleeve to said shaft for rotation therewith, said retaining clamps each comprising complementary elements coacting to present portions supportingly receiving said ends of said sleeve and positioning the latter in coaxial relation to said shaft.

10. A bearing assembly comprising a fixedly supported housing having an opening therethrough, a hollow insert detachably fixed in said housing by an externally accessible means affording removal of said insert axially of said opening, said insert presenting an inner cylindrical bearing surface, a sleeve journaled in said bearing surface and extending beyond the opposite ends of said insert and of said housing, said sleeve comprising complementary arcuate segments, a shaft extending freely through said sleeve, said sleeve having an internal diameter sufficiently greater than the external diameter of said shaft to provide a radial space therebetween, and a retaining clamp removably fixedly securing opposite end portions of said sleeve to said shaft for rotation therewith, said retaining clamps each comprising complementary elements coacting to present portions supportingly receiving said ends of said sleeve and positioning the latter in coaxial relation to said shaft.

CHARLES L. BABB.

References Cited in the file of this patent

UNITED STATES PATENTS

| Number | Name | Date |
| --- | --- | --- |
| 288,489 | Proctor | Nov. 13, 1883 |
| 682,268 | Phillips | Sept. 10, 1901 |
| 846,796 | Kruesi | Mar. 12, 1907 |
| 1,210,836 | Ramsey | Jan. 2, 1917 |
| 2,192,665 | Robben | Mar. 5, 1940 |
| 2,499,456 | Browne | Mar. 7, 1950 |